United States Patent [19]

Doyen et al.

[11] Patent Number: 5,539,704
[45] Date of Patent: Jul. 23, 1996

[54] BAYESIAN SEQUENTIAL GAUSSIAN SIMULATION OF LITHOLOGY WITH NON—LINEAR DATA

[75] Inventors: Philippe M. Doyen, Thames Ditton; Lennert D. Den Boer, Middlesex, both of England

[73] Assignee: Western Atlas International, Inc., Houston, Tex.

[21] Appl. No.: 494,603

[22] Filed: Jun. 23, 1995

[51] Int. Cl.$^6$ .............................. G01V 1/40; G01V 1/34
[52] U.S. Cl. .............................. 367/73; 367/14; 367/15; 364/421
[58] Field of Search .............................. 367/14, 15, 37, 367/73; 364/428, 421, 806; 382/51

[56] References Cited

U.S. PATENT DOCUMENTS

| | | | |
|---|---|---|---|
| 4,964,088 | 10/1990 | Chittineni | 367/51 |
| 5,179,441 | 1/1993 | Anderson et al. | 358/88 |
| 5,321,613 | 6/1994 | Porter et al. | 364/420 |
| 5,450,371 | 9/1995 | MacKay | 367/63 |
| 5,465,321 | 11/1995 | Smyth | 364/578 |

OTHER PUBLICATIONS

Doyen et al, 69th Annu. SPA Tech Conf., Sep. 25, 1994. pp. 197–211, SPE–28382; only abst. available.
Omre et al, Math Geol., vol. 21, #7, pp. 767–786, Oct. 1989; abst. only.
Easley et al, Geophysics, vol. 55, #11, pp. 1435–1440, Nov. 1990; abst. only.

*Primary Examiner*—Nelson Moskowitz
*Attorney, Agent, or Firm*—William A. Knox

[57] ABSTRACT

A multivariate stochastic simulation application that involves the mapping of a primary variable from a combination for sparse primary data and more densely sampled secondary data. The method is applicable when the relationship between the simulated primary variable and one or more secondary variables is non-linear. The method employs a Bayesian updating rule to build a local posterior distribution for the primary variable at each simulated location. The posterior distribution is the product of a Gaussian kernel function obtained by simple kriging of the primary variable and a secondary probability function obtained directly from a scatter diagram between primary and secondary variables.

13 Claims, 4 Drawing Sheets

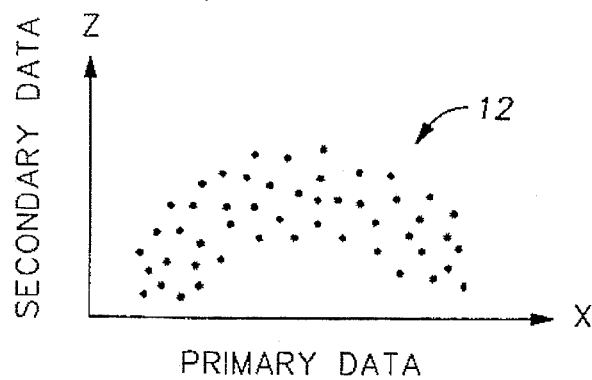
FIG. 3A
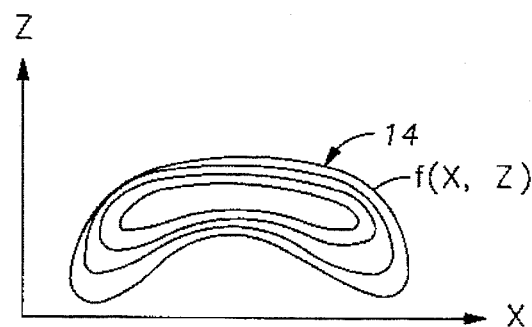
FIG. 3B
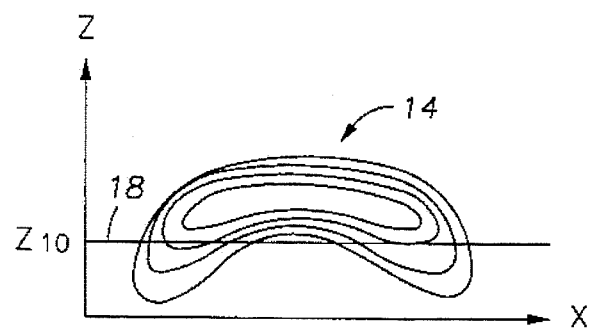
FIG. 5
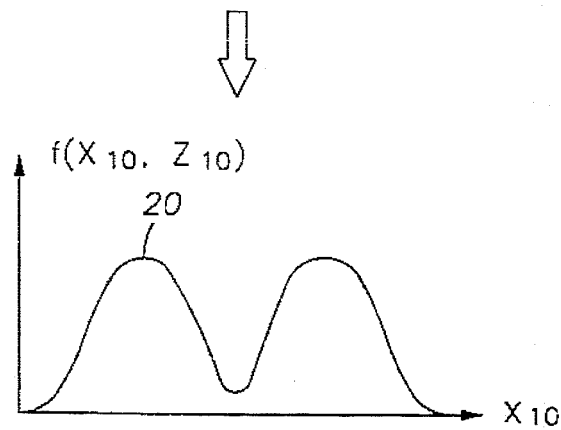

5,539,704

BAYESIAN SEQUENTIAL GAUSSIAN SIMULATION OF LITHOLOGY WITH NON—LINEAR DATA

BACKGROUND OF THE INVENTION

1. Field of the Invention

A statistical method for modeling a primary subsurface petrophysical variable from a study of sparsely-distributed primary data in combination with closely-spaced secondary measurements.

2. Discussion of Related Art

During the course of seismic exploration, an acoustic wavefield is generated at or near the surface of the earth to insonify the underlying earth layers or strata. The wavefield is reflected in turn from each subsurface stratum whence the wavefield returns to the surface. The returning reflected wavefield manifests itself as a periodic mechanical motion of the earth's surface that is detected by suitable sensors. The sensors convert the mechanical motion to electrical signals which are recorded on an archival storage medium such as time-scale recordings in analog or digital format as desired by the investigator.

Quantities of interest include reflection travel time and reflection amplitude. Reflection travel time is a measure of the depths of the respective strata. Reflection amplitude depends upon the reflectivity coefficient at the interface between two strata. The reflectivity coefficient depends upon the difference in acoustic impedance across the interface. The acoustic impedance of a stratum is defined by the product of the acoustic velocity and the density of that rock layer. Acoustic impedance is measured in units of meters per second per gram per cubic centimeter.

To be of use quantitatively, the observed reflection amplitude must be corrected for spherical spreading, instrumental artifacts and other predictable effects to provide true amplitude measurements. The resulting true amplitudes may be used to calculate the acoustic impedances of the respective strata. A change in acoustic impedance may be a parameter indicative of a change in rock type.

In the course of geoexploration, control points may be established by boreholes, often quite widely separated, that penetrate strata of interest. At such sparse control points one can make actual measurements of selected petrophysical variables which constitute measurements of a primary variable. Collocated and preferably concurrent measurements of a selected seismic attribute comprise measurements of a secondary variable that may be calibrated with respect to the primary measurements.

The desideratum of a seismic survey line, having relatively closely-spaced observation stations that are distributed between the sparse control points, is to estimate the continuity and distribution of a primary petrophysical variable on the basis of measurements of a secondary variable based on the seismic data. Although seismic measurements are preferred because of their greater resolution, measurements of other geophysical quantities including potential field data may also be used.

By way of definition, in this disclosure, the terms "station", "point", "observation point", "observation station", "measurement point" are synonymous. The term "pixel" refers to a virtual or real pictorial element representative of the mapped location of a measurement station. A "control point" is a location whereat an actual measurement is made of a selected petrophysical variable.

U.S. Pat. No. 4,926,394 issued May 15, 1990 to Phillipe M. Doyen and assigned to the assignee of this invention, teaches a type of Monte Carlo statistical method for estimating the variation in rock type or texture, that is, the change in lithology along a given stratum or a related grouping of strata within a selected geologic formation. The estimates are based on seismic data gathered over an array of survey lines that coincide with sparsely-spaced control points such as boreholes. This is a type of maximum a posteriori estimation technique. It suffers from the disadvantages that a) it is computer intensive; b) it is sometimes difficult to guarantee convergence of the iterative optimization procedure used in the technique; c) it is difficult to specify the required lithology transition statistics.

In a paper by Hua Zhou et al. entitled *Formatting and Integrating Soft Data: Stochastic Imaging via the Markov-Bayes Algorithm*, published in Geostatics Tróia, 92, Kluwer Publishers, encodes, under a Bayesian framework, local prior probability distributions from both hard data, that is, primary data derived from actual measurements of a desired variable at control points such as boreholes, and soft data derived from measurements of an associated secondary variable such as seismic data. The local prior distributions of a petrophysical property are then updated into posterior distributions using nearby hard and soft data. The posterior distributions provide models of uncertainty prevailing at sampled locations. The Markov-Bayes algorithm for such updating can be seen as cokriging capitalizing of spatial correlations between prior distribution values. A Markov-type assumption stating that the hard data prevail over collocated soft data, allows determination of the hard/soft data coregionalization model through some simple calibration parameters.

Paper SPE 24742 entitled *Integrating Seismic Data in Reservoir Modeling: The collocated Cokriging Alternative*, written by W. Xu et al, delivered at the 1992 SPE Annual Technical Conference, explains that two sources of information commonly available for modeling the top of a structure: 1) Depth data from wells and 2) Geophysical measurements from seismic surveys, are often difficult to integrate. They teach use of geostatistical methods such as collocated cokriging to integrate the accurate but sparse well measurements with the generally less precise but more abundant seismic measurements.

Another paper of interest entitled *Geophysical-hydrological Identification of Field Permeabilities Through Bayesian Updating*, by Nadim Copty et al. is published in Water Resources Research, v. 29, n. 8, pp. 2813–2825, August, 1993. Here is presented a Bayesian method to identify the spatial distribution of water-reservoir permeability. The approach incorporates densely-spaced seismic velocity measurements with sparsely-sampled permeability and pressure data. The two classes of data exhibit a semi-empirical relationship which is used to update the data in the Bayesian sense.

U.S. Pat. No. 5,416,750 issued May 16, 1995 to Phillipe Doyen et al. assigned to the assignee of this invention and incorporated herein by reference, teaches simulation of a discretized lithologic model of the subsurface that is defined by a regular array of pixels. Each pixel corresponds to one of a finite number of possible lithoclasses such as sand, shale or dolomite. The lithoclasses are unknown except at a small number of sparsely distributed control pixels associated with borehole locations. Associated with each pixel there is a multivariate record of seismic attributes that may be statistically correlatable with the local lithology. A Monte Carlo method is used to simulate the lithoclass spatial distribution by combining the lithologic data at control pixels with data records of seismic attributes. Using Indicator Kriging, a prior probability distribution of the lithoclasses is calculated for each pixel from the lithology values at neighboring pixels. The likelihood of each lithoclass is also calculated in each pixel from the corresponding conditional probability distribution of seismic attributes. A posterior lithoclass probability distribution is obtained at each pixel by multiplying the prior distribution and the likelihood function. The posterior distributions are sampled pixel-by-pixel to generate equally probable models of the subsurface lithology.

The method outlined in the '750 patent is suitable for use with lithology wherein the variation in a rock property may be defined in terms of discrete classes such as sand or shale or limestone. Other rock properties such as permeability or porosity may vary continuously rather than discretely between control points. This invention proposes a new multivariate stochastic method which can be applied when the relationship between the simulated continuous primary variable and one or several collocated secondary variables is non linear.

SUMMARY OF THE INVENTION

A method is provided for simulating a continuous primary variable on a regular array of pixels by combining primary data available at a small number of control pixels with secondary measurements available at all pixels and statistically correlated with the primary data. The mean and variance of the Gaussian prior distribution of the primary variable are estimated from the primary data at the control pixels. The joint probability distribution function of the primary and secondary variables is estimated from a scatter diagram of the primary and secondary data. An as-yet unsimulated pixel is chosen at random from the array. The Gaussian conditional distribution of the primary variable at the selected pixel is estimated by kriging the primary data available at the control pixels. A probability ratio function is calculated between the conditional distribution and the prior distribution of the primary variable at the selected pixel. A secondary probability function is obtained by slicing the joint distribution function at a value corresponding to the measured secondary data at the selected pixel. Finally, the posterior distribution is computed at the selected pixel by taking the product of the secondary probability function and the probability ratio function. A simulated primary value is drawn at the selected pixel by sampling at random from the local posterior distribution. The simulated value is entered in the array of pixels as an additional control pixel. The above steps are repeated until simulated values for the primary variable have been assigned to all of the pixels. The simulated values of the primary variable as mapped over the regular array of pixels provide a visual display of the spatial distribution of the primary variable.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIG. 3A is a scatter diagram of measured primary and secondary variables;

FIG. 3B is a contour map of the scatter diagram of FIG. 3A representing the joint probability distribution of the primary and secondary variables;

FIG. 5 shows the process of extracting a 1-D slice through the joint distribution map of FIG. 3B to obtain the secondary probability function;

DETAILED DESCRIPTION OF THE PREFERRED EMBODIMENT

A limitation of the cokriging formalism discussed in the related-art citations above, is the use of a generalized linear regression model. This linear model is inappropriate when the relationship between primary and secondary variables cannot be summarized using coefficients of linear correlation. A new form of sequential cosimulation is here provided that can be used when a complex relationship exists between a primary variable and one or several secondary variables. Reliance on cokriging or the definition of indicator variables is not needed. The method uses a Bayesian updating rule to construct a local posterior distribution for the primary variable at each simulated point. The posterior distribution is calculated by taking the product of a Gaussian kernel obtained using simple kriging and a secondary probability function inferred directly from a scattergram between the primary variable and secondary attributes. Sequential sampling of the local posterior distributions generates conditional simulations that reproduce approximately the local relationship between primary and secondary variables. This process reduces to the collocated cokriging form when the relationship between the primary and secondary variables is Gaussian.

Figure 1:
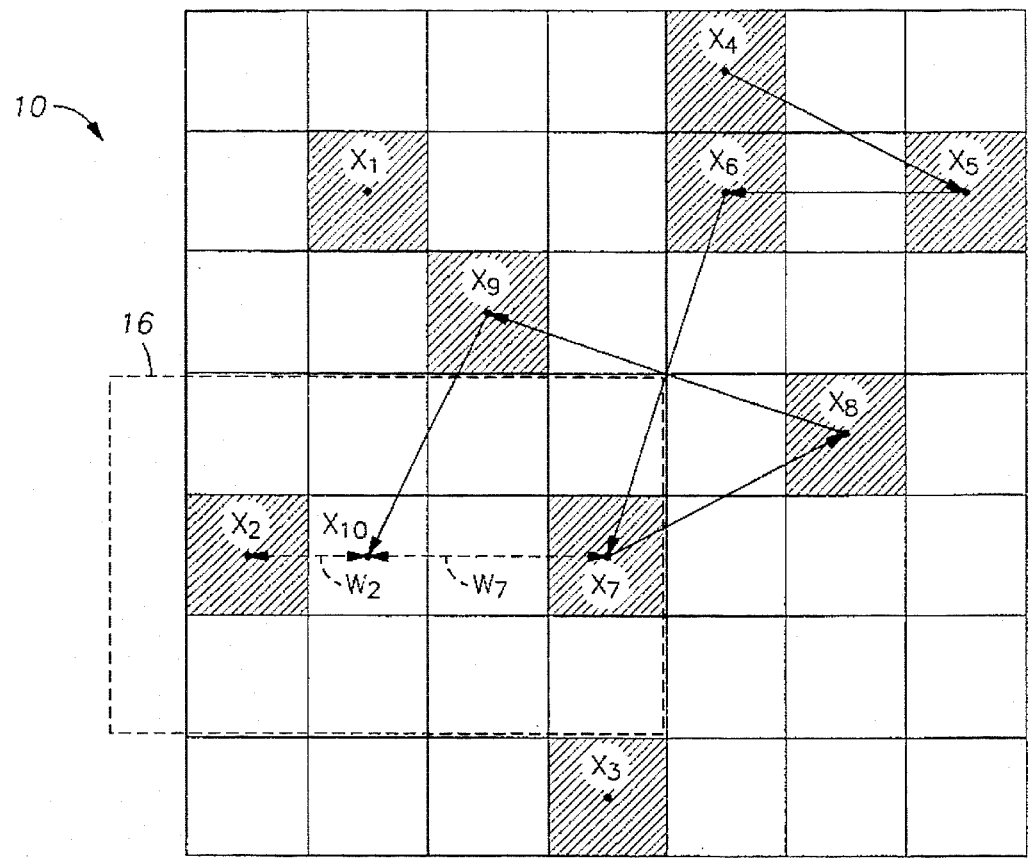
FIG. 1 represents a rectangular array of pixels representative of a region of interest including control pixels.

FIG. 1 represents a discretized subsurface model of a layer of the earth, 10, shown as an array of pixels, labeled using integers i. In the Figure, the integers represent the order of the pixel visitation sequence to be explained later. The pixels correspond to the mapped surface locations of observation stations such as seismic stations, distributed over a region of interest. Although only a few exemplary such stations are shown in FIG. 1, it should be understood that many thousand stations may be distributed over an area of interest in the real world. At each pixel i, a continuous primary variable $x_i$ is defined which is an average petrophysical parameter for the 3-D subsurface element.

The values of the primary variables $x_i$ are unknown except at a small number of control pixels such as pixels 1-3 of FIG. 1 where actual values of the primary variable can be measured. The measurements from the control pixels form the members of a first measurement set. In practice, the control pixels correspond, for example, to boreholes such as well locations or other hard input-data sources. Pixels 4-9 represent randomly-visited pixels at which the primary variable has been simulated and which will be treated as new simulated control pixels. Pixel 10 has yet to be simulated.

For purposes of this disclosure, "a large number" and "a small number" are comparative terms to indicate an approximate order of magnitude. By way of example but not by way of limitation, the former term may indicate an array of tens of thousands of seismic stations or pixels while "a small number" may indicate but a few tens of control points.

The variables $x_i$ are assumed to belong to a second order stationary multi-Gaussian random field fully characterized by the mean $$E\{x_i\}=m_x \quad (1)$$

and by the spatial covariance $$E\{[x_i-m_x][x_j-m_x]\}=C(h_{ij}) \quad (2)$$

where $h_{ij}$ is the interdistance vector between pixel i and j. When the spatial variations are anisotropic, the covariance depends on both the modulus and the direction of $h_{ij}$.

From the primary data at control pixels, the mean $m_x$ and the variance $\sigma_x^2$ are estimated to define the Gaussian prior distribution $$p(x_i) \sigma \exp\{-([x_i-m_x]^2)/(2\sigma_x^2)\}. \quad (3)$$

Figure 2:
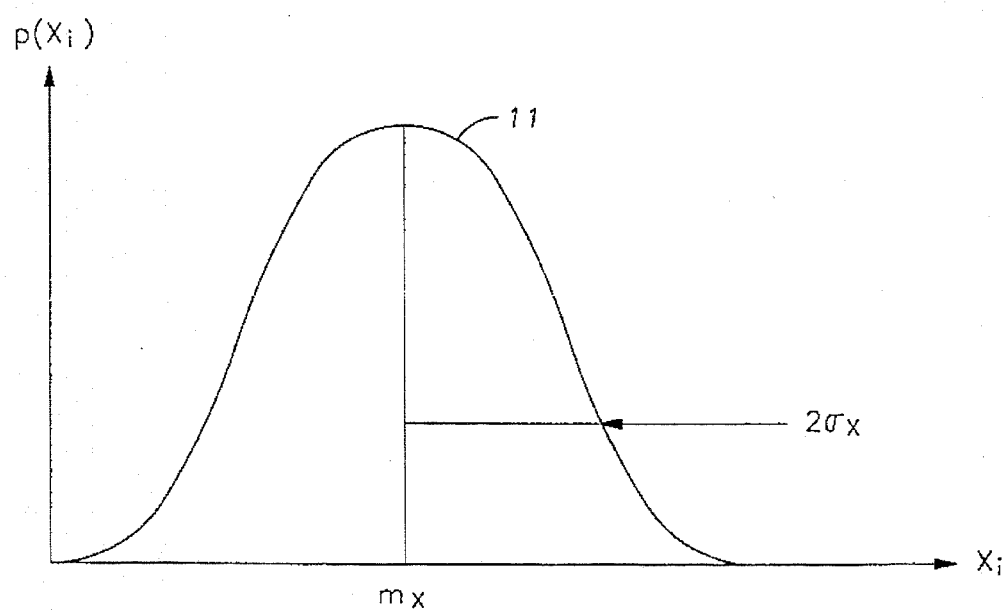
FIG. 2 is an example of a Gaussian prior distribution of a primary variable.

The Gaussian prior distribution of the primary variable is shown by curve 11 in FIG. 2. By way of example but not by way of limitation, the prior distribution may be assumed to be the same for all pixels.

A secondary variable $z_i$ is measured at all pixels i. The secondary data, as measured at a pixel i, provides indirect information about the primary variable at the same pixel. Measurements of the secondary variable at the respective pixels comprise the members of a second measurement set. Preferably measurements of the secondary variable are made concomitantly with measurements of the primary variable so that the results of the study are not biased by possible differential secular drift of the variables.

The secondary variable $z_i$ represents for example a seismic attribute which is statistically correlated with the primary variable. The relationship between the primary variable $x_i$ and the secondary variable $z_i$ may be statistically calibrated by using a scatter diagram generally shown as 12 in FIG. 3A. The points in the scatter plot correspond to measurements of the primary and collocated secondary variables at actual control pixels (but not at the simulated pixels). From the scatter plot, a contour map may be drawn as shown by the contour pattern 14 in FIG. 3B representing the joint probability distribution function f(x,z). By way of example but not by way of limitation, the distribution is assumed to be the same for all pixels.

Referring back to FIG. 1, select at random some pixel such as i=10. Estimate the mean $m_k(i)$ and variance $\sigma_k^2(i)$ of the Gaussian conditional distribution of the primary variable $p(x_i|x_1,\ldots,x_{i-1})$ at the selected pixel by kriging the primary data $x_1,\ldots,x_{i-1}$ corresponding either to the original control pixels or to previously simulated pixels that are encompassed within a search region 16, such as is taught by the '750 patent previously cited. The Gaussian conditional distribution is defined as $$p(x_i|x_1,\ldots,x_{i-1})\sigma \exp\{-([x_i-m_k(i)]^2)/(2\sigma_k^2(i))\}. \quad (4)$$

For the configuration illustrated in FIG. 1, at pixel i=10, $$\begin{vmatrix} m_k(10) = m_x + w_2(x_2 - m_x) + w_7(x_7 - m_x) \\ \sigma_k^2(10) = \sigma_x^2 - w_2 C_{2,10} - w_7 C_{7,10} \end{vmatrix}$$

where the weights $w_2$ and $w_7$ are obtained from the solution of the following kriging system $$\begin{vmatrix} \sigma_x^2 & C_{2,7} \\ C_{7,2} & \sigma_x^2 \end{vmatrix} \begin{vmatrix} w_2 \\ w_7 \end{vmatrix} = \begin{vmatrix} C_{2,10} \\ C_{7,10} \end{vmatrix}$$

where $C_{i,j}=C(h_{ij})$ denotes the spatial covariance evaluated for the interdistance vector $h_{ij}$ between pixels i and j. For this illustrative example, only two control pixels were available from within the search area, namely $x_2$ and $x_7$, for use in the kriging procedure. Excluded, were the control pixels that did not fall within the search region 16 centered on the selected pixel as shown in FIG. 1. The kriging equations are straightforward to generalize if the effect of more distant control pixels are taken into account in the calculation of $m_k$ and $\sigma_k^2$.

The probability ratio function between the conditional probability distribution and the prior distribution of the primary variable at the selected pixel is:

$$\frac{p(x_i|x_1,\ldots,x_i-1)}{p(x_i)} \propto \exp\left[-\frac{[x_i - m_r(i)]^2}{2\sigma_r^2(i)}\right]. \quad (5)$$

In (5), $\sigma_r^2(i)$ and $m_r(i)$ are defined as:

$$\sigma_r^2(i) = \frac{\sigma_k^2(i)}{1 - \sigma_k^2(i)/\sigma_x^2}, \quad (6)$$

and $$m_r(i) = \frac{m_k(i) - m_x \sigma_k^2(i)/\sigma_x^2}{1 - \sigma_k^2(i)/\sigma_x^2}. \quad (7)$$

Figure 4:
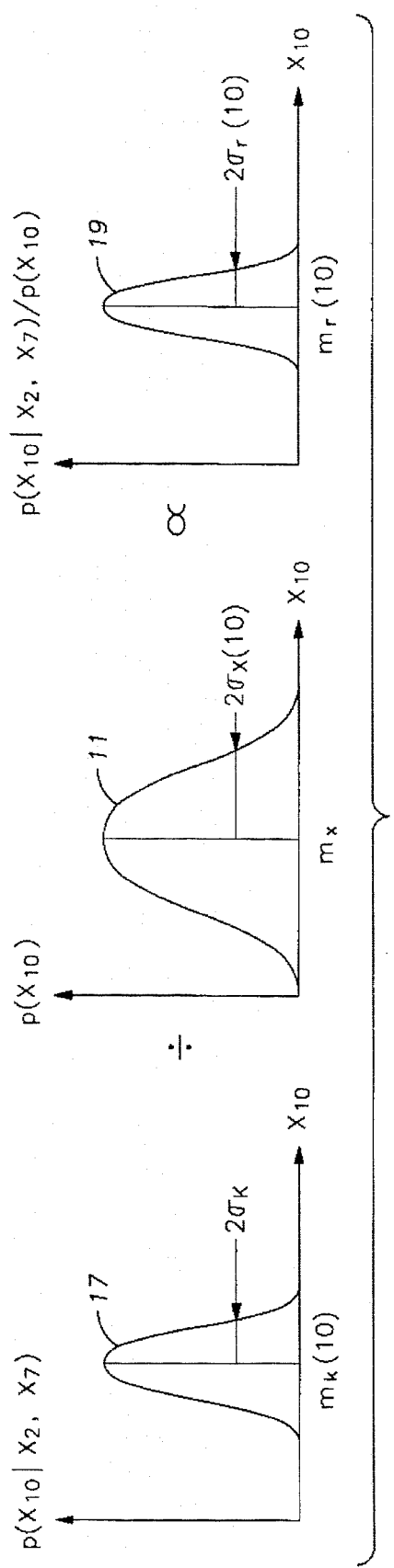
FIG. 4 is a graphic interpretation of the ratio between the conditional probability distribution and the prior distribution of the primary variable.

A graphical interpretation of equations (4) and (5) for pixel 10, FIG. 1, is shown in FIG. 4. Curve 17 is the Gaussian conditional distribution given by equation (4), curve 11 is the prior distribution of the primary variable from equation (3) and curve 19 is the probability ratio from equation (5).

The measured secondary variable is equal to $z_i$ at the randomly selected pixel. The secondary probability function at the selected pixel is obtained by extracting an horizontal slice through the joint probability distribution f(x,z) at a value corresponding to the measured $z_i$. In FIG. 5, line 18 portrays the slice extracted from f(x,z), as represented by contour pattern 14 and curve 20 represents the sliced secondary probability function corresponding to the secondary data $z_{10}$ at pixel i=10 in FIG. 1.

Figure 6:
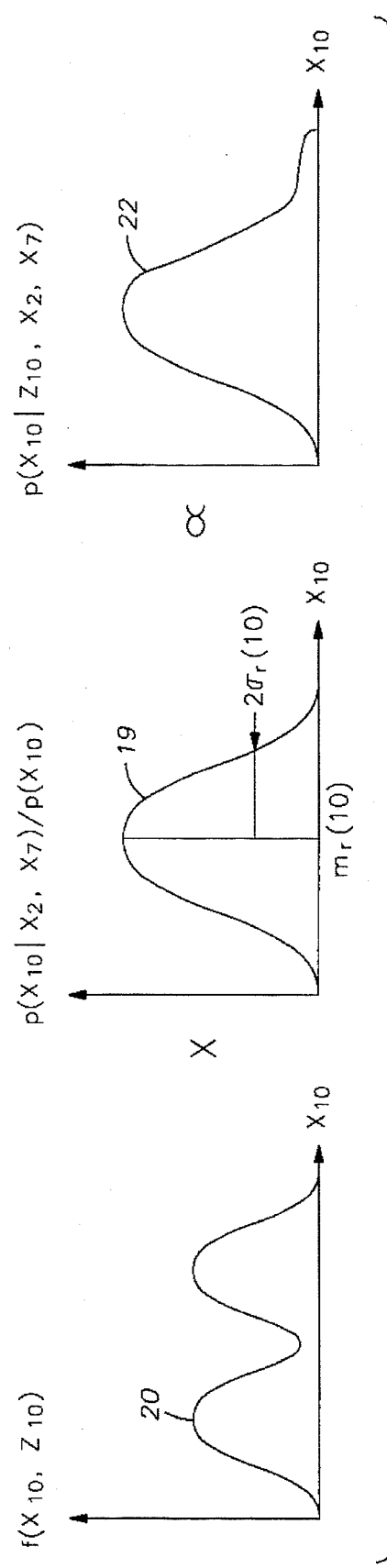
FIG. 6 shows the derivation of the local posterior distribution attributable to pixel 10 of FIG. 1.

The local posterior distribution at pixel i, $p(x_i|z_i,x_1,\ldots,x_{i-1})$ is determined by taking the product of the secondary probability slice 20 and the probability ratio 19 given by equation (5). A graphical illustration of the process is shown by the curve 22 in FIG. 6.

In the special case where a Gaussian model can be used to describe the statistical relationship between primary and secondary variables, the posterior distribution is also Gaussian and can be expressed analytically as $$p(x_i|Z_i,x_1,\ldots,x_{i-1})\alpha \exp(-[x_i-m_i]^2/2\sigma_i^2),$$

where the mean $m_i$ and variance $\sigma_i^2$ are given by:

$$m_i = \rho z_i \frac{\sigma_k^2(i)}{\rho^2[\sigma_k^2(i) - 1] + 1} + m_k(i) \frac{(1 - \rho^2)}{\rho^2[\sigma_k^2(i) - 1] + 1} \quad (8)$$

and $$\sigma_i^2 = \sigma_k^2(i) \frac{(1 - \rho^2)}{\rho^2[\sigma_k^2(i) - 1] + 1} \quad (9)$$

where $\rho$ is the coefficient of linear correlation between the primary and secondary variables. In this special case, the mean of the posterior distribution is obtained as a weighted average of the kriging mean $m_k(i)$ and the secondary data $z_i$ at the selected pixel, without the need to solve a cokriging system. To simplify notation, and without loss of generality, (8) and (9) assume the primary and secondary variables have been normalized to have zero means and unit variances.

The simulated value for $x_i$ is drawn at random from the estimated posterior distribution $p(x_i | Z_i, x_1, \ldots, x_{i-1})$. The simulated value is treated as an additional control pixel for simulation of other pixels. The process of building and sampling a local posterior distribution is repeated at all pixels, following a random visitation sequence to avoid artifacts. A global model of the simulated primary variable is obtained when all pixels have been visited.

In common with any large-scale statistical number-manipulation process, the best method of operation presently envisioned is preferably implemented with the aid of any desired type of programmed computer including a memory module, a data processor and a computer graphics program for mapping the distribution of the simulated primary variable over the array of pixels. One such computer graphics programs is supplied under the trademark SigmaView, a commercial program provided by the assignee of this invention.

Figure 7:
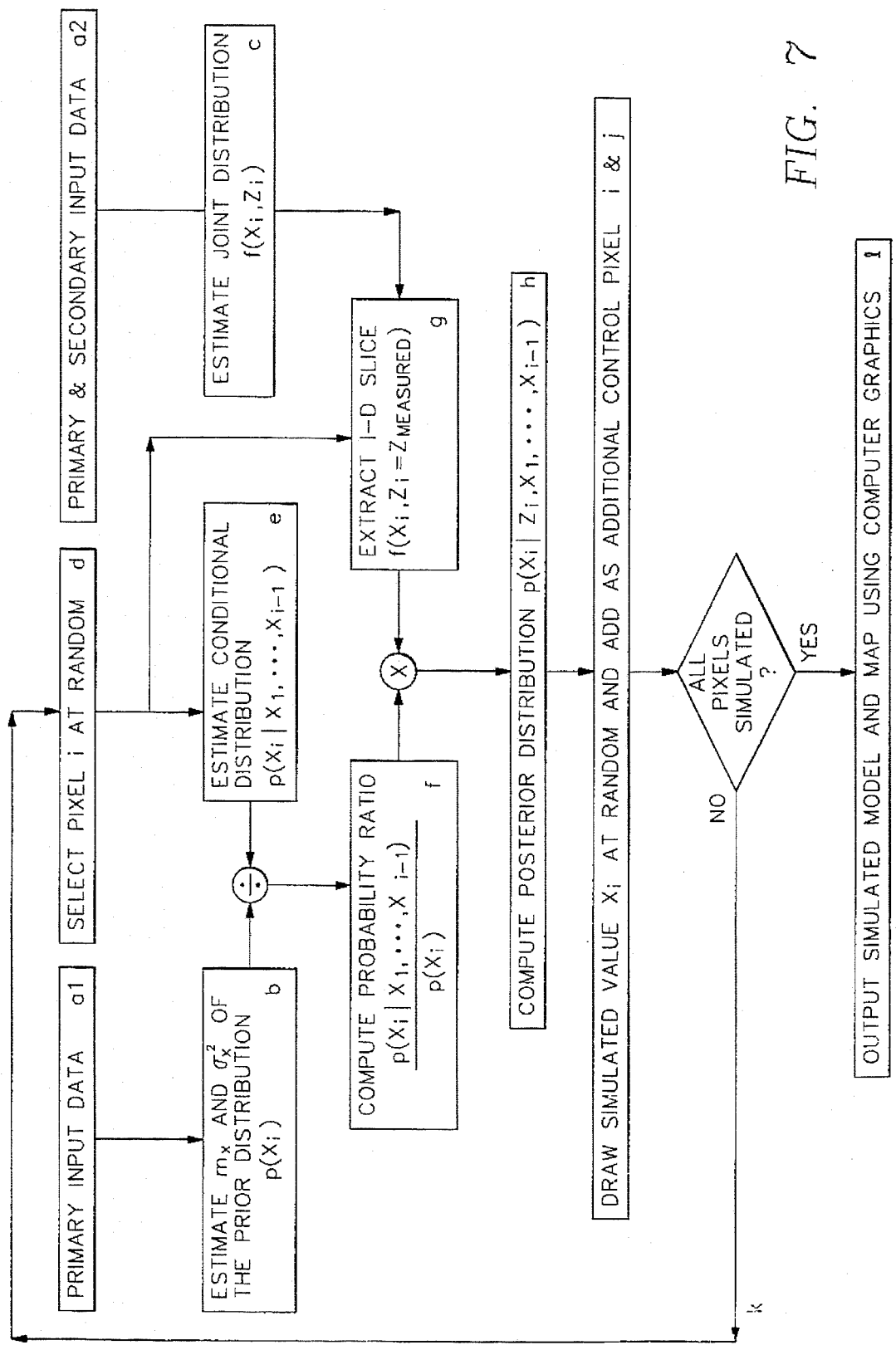
FIG. 7 is a flow diagram of a computer program for implementing the process of this invention.

A computer applications program for carrying out the process of this invention is shown by means of a flow diagram of FIG. 7. The flow diagram, which is self-explanatory, summarizes the mathematical steps that were discussed in detail above so that there is no need to repeat the sequence of operations. The primary and secondary measurement sets are input to the computer memory module. Thereafter, the data are processed as shown by the flow diagram. Typically, a program for instructing the computer to carry out the processing steps previously explained in detail, may be embodied in any desired type of tangible machine-readable medium such as a floppy diskette, magnetic tape, optical storage medium or any other computer-readable medium now known or yet to be discovered.

As with any statistical procedure, the petrophysical model resulting from this analysis is not unique. In practice, a number, such as n, of alternative equiprobable models are obtained by repeating the simulation process with different random visitation paths. A final preferred model may be obtained for example by taking the mean value from the n simulated models at each pixel.

This method has been described in the case of a bivariate relationship between the primary variable and a single secondary variable. The method remains applicable if a vector z of secondary data is available at each pixel. In that case, the secondary probability function is obtained by taking a 1-D slice through the multivariate density function f(x,z) constructed from the multivariate scatter plot.

This invention has been described with a certain degree of specificity by way of example but not by way of limitation. For example, the method has been described in terms of an array of pixels in two-dimensional space. The method may be extended to an array of volume elements or voxols in three-dimensional space. The invention herein disclosed suggests that the secondary variable be derived from seismic data. However, any other suitable type of geophysical data may be used such as measurements of the electrical, magnetic or gravitational fields over a region of interest.

Those skilled in the art will devise obvious variations to the examples given herein but which will fall within the scope and spirit of this invention which is limited only by the appended claims.

What is claimed is:

1. A method for modeling the spatial distribution of a continuous primary petrophysical variable over a regular array of a large number of pixels representative of secondary observation stations, comprising:

a) assembling in a programmed computer including a data processor, a first set of measurements of a primary variable at a small number of control pixels and a second set of measurements of an associated secondary variable at all pixels of said array;

b) estimating the mean and variance of the Gaussian prior distribution of the primary variable from the first measurement set;

c) estimating the joint probability distribution of the primary and secondary variables from a scatter diagram of the first and second measurement sets at the control pixels;

d) selecting an as-yet unsimulated pixel at random;

e) estimating the Gaussian conditional probability distribution of the primary variable at said selected pixel by kriging the primary data at control pixels within a selected search region encompassing said selected pixel;

f) in the data processor, calculating the probability ratio between said conditional probability distribution and the prior distribution at said selected pixel;

g) extracting a one-dimensional slice through the joint probability distribution corresponding to a measured value of the secondary data at said selected pixel;

h) calculating, in the data processor, a posterior probability distribution for the primary variable at said selected pixel by taking the product of the probability ratio and the extracted one-dimensional slice;

i) drawing a simulated value for said primary variable at said selected pixel by sampling at random from said posterior probability distribution;

j) entering the simulated value of said primary variable into said array at said selected pixel as an additional control pixel;

k) repeating steps d) through j) until the primary variable is simulated for all pixels of the array;

l) with the aid of a computer graphics program, mapping the distribution of the simulated primary petrophysical variable over the array of pixels.

2. The method as defined by claim 1, comprising:

repeating steps d) through l) n times to provide n equally likely models of the simulated primary variable consistent with the secondary measurements and the known primary data measurements at said control pixels; and averaging the n equally likely models of the simulated primary variable; and executing step l) using the average model.

3. The method as defined by claim 2, wherein:

simulated values at each pixel are obtained from a vector including more than one secondary variable.

4. The method as defined by claim 3, wherein:

the step of estimating the Gaussian conditional distribution of the primary variable at each said selected pixel includes the step of specifying a spatial covariance model to characterize the spatial continuity of the primary variable.

5. A method for simulating a model of the distribution of a continuous primary variable over a regular array of a plurality of pixels, comprising:

a) measuring known values of a primary variable at selected control pixels as primary control data;

b) measuring values of a secondary variable at all of said plurality of pixels;

c) estimating the mean and variance of the Gaussian prior distribution of the primary control data;

d) estimating the joint probability distribution of the primary control data and collocated secondary measurements from a scattergram of the primary control data and corresponding measurements of the secondary variable;

e) selecting an as-yet unsimulated pixel at random;

f) establishing a search region encompassing said randomly selected pixel;

g) estimating the Gaussian conditional probability distribution of the primary variable at said selected pixel by kriging the primary control data at desired control pixels within said search region;

h) calculating the probability ratio between said conditional probability distribution and said prior distribution at said selected pixel;

i) extracting a one-dimensional slice through the joint probability distribution corresponding to the measured secondary data at said selected pixel;

j) calculating a posterior probability distribution for the primary variable at said selected pixel by taking the product of said probability ratio and said extracted one-dimensional slice;

k) drawing a simulated value for said primary variable at said selected pixel by sampling at random from said posterior probability distribution;

l) entering the simulated value of said primary variable into said array at said selected pixel as an additional control pixel;

m) repeating steps e) through l) until values for the primary variable are simulated for all pixels of the array;

n) mapping the simulated values of said primary variable over said array of pixels.

6. A method for mapping the estimated spatial distribution of a continuous primary variable over an area of interest, comprising:

a) distributing a regular array of spaced-apart seismic stations over said area;

b) at selected control stations collecting actual measurements of a primary petrophysical variable as primary control data and concomitantly collecting measurements of an associated secondary seismic variable at all stations;

c) estimating the mean and variance of the Gaussian prior distribution of the primary control data;

d) calibrating measurements of the secondary variable, by estimating the joint probability distribution of the primary and collocated secondary measurements from a scattergram of the primary control data and corresponding measurements of the secondary variable;

e) selecting an as-yet unsimulated station at random;

f) defining a search region around said selected station;

g) estimating the Gaussian conditional probability distribution of the primary variable at said selected station by kriging the primary control data at desired control stations within said search region;

h) calculating the probability ratio between said conditional probability distribution and said prior distribution at said selected station;

i) extracting a one-dimensional slice through the joint probability distribution corresponding to the measured secondary data at said selected station;

j) calculating a posterior probability distribution for the primary variable at said selected station by taking the product of said probability ratio and said extracted one-dimensional slice;

k) drawing a simulated value for said primary variable at said selected station by sampling at random from said posterior probability distribution;

l) entering the simulated value of said primary variable into said array at said selected station as an additional control station;

m) repeating steps d) through l) until values for the primary variable are simulated for all stations of the array to define an estimate of the global distribution of the primary variable over the array of stations;

n) with the aid of a computer graphics program, displaying the global distribution.

7. The method as defined by claim 6, comprising:

executing steps d) through m) n times to provide n global distributions;

averaging the n global distributions; and displaying the average of the n global distributions.

8. A method for mapping the estimated distribution of a continuous primary variable over an area of interest, comprising:

a) defining a regular array of spaced-apart measurement stations over said area;

b) at selected control measurement stations, collecting actual measurements of a primary petrophysical variable as primary control data and concomitantly collecting measurements of an associated secondary geophysical variable at all measurement stations;

c) estimating the mean and variance of the Gaussian prior distribution of the primary control data;

d) calibrating measurements of the secondary variable by estimating the joint probability distribution of the primary and collocated secondary measurements from a scattergram of the primary control data and corresponding measurements of the secondary variable;

e) selecting an as-yet unsimulated measurement station at random, encompassing said selected measurement station by a selected search region and estimating the Gaussian conditional probability distribution of the primary variable by kriging the primary control data within said search region;

f) calculating the probability ratio between said conditional probability distribution and said prior distribution;

g) extracting a one-dimensional slice through the joint probability distribution corresponding to the measured secondary data at said selected measurement station;

h) multiplying said probability ratio by said extracted one-dimensional slice to provide a posterior probability distribution;

i) drawing a random sample from the posterior probability distribution to provide a simulated value for the primary variable;

j) entering the simulated value of said primary variable into said array at said selected measurement station as an additional control measurement station;

k) repeating steps e) through j) until values for the primary variable are simulated for all measurement stations of the array to define the global distribution of the primary variable over the array of measurement stations;

l) with the aid of a computer graphics program, displaying the global distribution.

9. A method for modeling the spatial distribution of a continuous primary petrophysical variable over an area of interest, comprising:

a) distributing a regular array of spaced-apart pixels over said area;

b) assembling in a programmed computer including a data processor, a first set of measurements of a primary variable at a small number of control pixels and a second set of measurements of an associated secondary variable at all pixels of said array;

c) normalizing the first and second measurement sets such that the primary and secondary variables have zero means and unit variances;

d) estimating the coefficient of correlation between the primary and secondary variables from a scatter diagram of the first and second measurement sets at the control pixels;

e) selecting an as-yet unsimulated pixel at random;

f) estimating the mean and variance of the Gaussian conditional distribution of the primary variable at the selected pixel by kriging the primary data at control pixels within a designated search region encompassing said randomly-selected pixel;

g) in said data processor, calculating the mean and variance of the Gaussian posterior distribution for the primary variable at said selected pixel from the coefficient of correlation estimated in step d), the measured secondary data at said selected pixel and the mean and variance calculated in step f);

h) drawing a random sample from the posterior probability distribution to provide a simulated value for the primary variable;

i) entering the simulated value of said primary variable into said array at said selected station as an additional control pixel;

j) repeating steps e) through i) until values for the primary variable are simulated for all pixels of the array to define the spatial distribution of the simulated primary variable over the array of pixels;

k) with the aid of a computer graphics program, displaying a map of the spatial distribution of the simulated primary variable over the area of interest.

10. The method as defined by claim 9, comprising:

repeating steps e) through j) n times to provide n equally likely models of the spatial distribution of the simulated primary variable over the area of interest;

averaging the n equally likely models; and executing step k) using the averaged model.

11. An article of manufacture, comprising:

a global display of a model of the spatial distribution of a simulated continuous primary petrophysical variable over a region of interest produced by the process as defined by claims 2 or 9.

12. An article of manufacture, comprising:

a tangible machine-readable medium that embodies a set of instructions for programming a computer to execute the process steps defined by claim 4.

13. An article of manufacture, comprising:

a tangible machine-readable medium that embodies a set of instructions for programming a computer to execute the process steps defined by claim 10.

* * * * *